US007503007B2

(12) United States Patent
Goodman et al.

(10) Patent No.: US 7,503,007 B2
(45) Date of Patent: Mar. 10, 2009

(54) CONTEXT ENHANCED MESSAGING AND COLLABORATION SYSTEM

(75) Inventors: Brian D. Goodman, Norwalk, CT (US); Frank Lawrence Jania, Chapel Hill, NC (US); Darren Mark Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 11/383,677

(22) Filed: May 16, 2006

(65) Prior Publication Data

US 2007/0271340 A1 Nov. 22, 2007

(51) Int. Cl.
G06F 3/00 (2006.01)
G06F 15/16 (2006.01)
G06F 7/00 (2006.01)

(52) U.S. Cl. .................. 715/758; 715/752; 709/204; 709/206; 707/104.1

(58) Field of Classification Search .................. 715/752, 715/753, 758; 709/204, 206; 707/104.1
See application file for complete search history.

(56) References Cited

U.S. PATENT DOCUMENTS

| 7,319,957 B2 * | 1/2008 | Robinson et al. ............ 704/252 |
| 2002/0023230 A1 | 2/2002 | Bolnick et al. | |
| 2002/0078158 A1 | 6/2002 | Brown et al. | |
| 2002/0126135 A1 | 9/2002 | Ball et al. | |
| 2004/0214609 A1 * | 10/2004 | Sagi et al. ................... 455/566 |
| 2004/0260753 A1 | 12/2004 | Regan | |
| 2004/0267740 A1 * | 12/2004 | Liu et al. ....................... 707/3 |
| 2005/0038797 A1 * | 2/2005 | Tabuchi ..................... 707/100 |
| 2005/0081150 A1 * | 4/2005 | Beardow ................... 715/531 |
| 2005/0132056 A1 | 6/2005 | Creamer et al. | |
| 2005/0149327 A1 * | 7/2005 | Roth et al. .................. 704/251 |
| 2005/0188016 A1 | 8/2005 | Vdaygiri et al. | |
| 2005/0262204 A1 | 11/2005 | Szeto et al. | |

* cited by examiner

*Primary Examiner*—Ting Zhou
(74) *Attorney, Agent, or Firm*—Francis Lammes; Stephen J. Walder, Jr.; Randall J. Bluestone

(57) ABSTRACT

A context enhanced messaging and collaboration system in which resources related to the context of text messages may be automatically identified and exchanged between users in association with the text messages, is provided. A graphical user interface (GUI) is provided for instant messaging between client devices. The GUI operates in conjunction with a context analysis engine that automatically analyzes the context of the textual messages being exchanged between the users and retrieves resources that correspond to the detected context. Representations of these automatically identified resources may be presented to the user via the GUI. The user of the GUI may enter text messages into the GUI and may select individual ones of the retrieved resources for transmission in association with the text messages. Furthermore, an automated mechanism may be used to select resources to attach to individual text messages entered by the user.

11 Claims, 7 Drawing Sheets

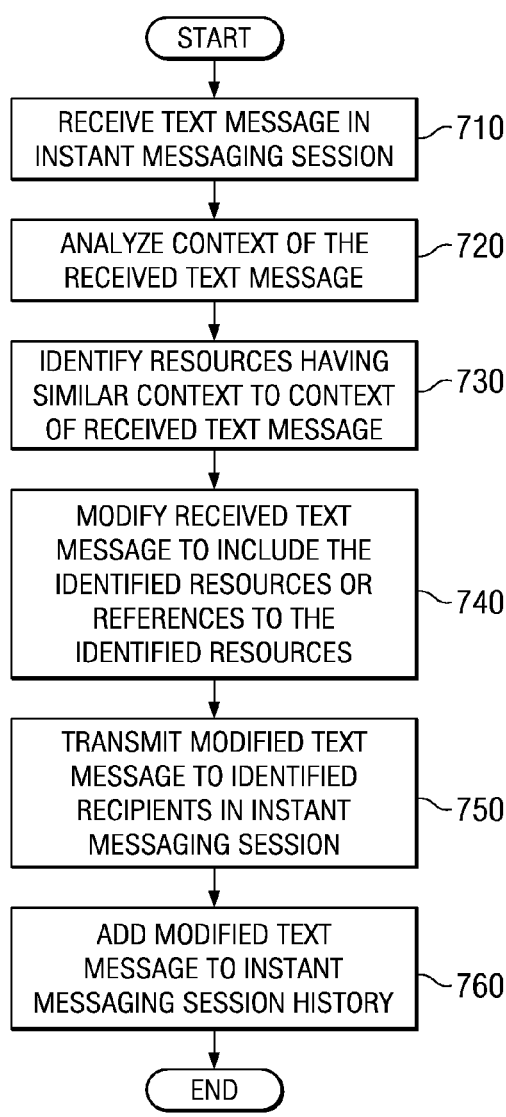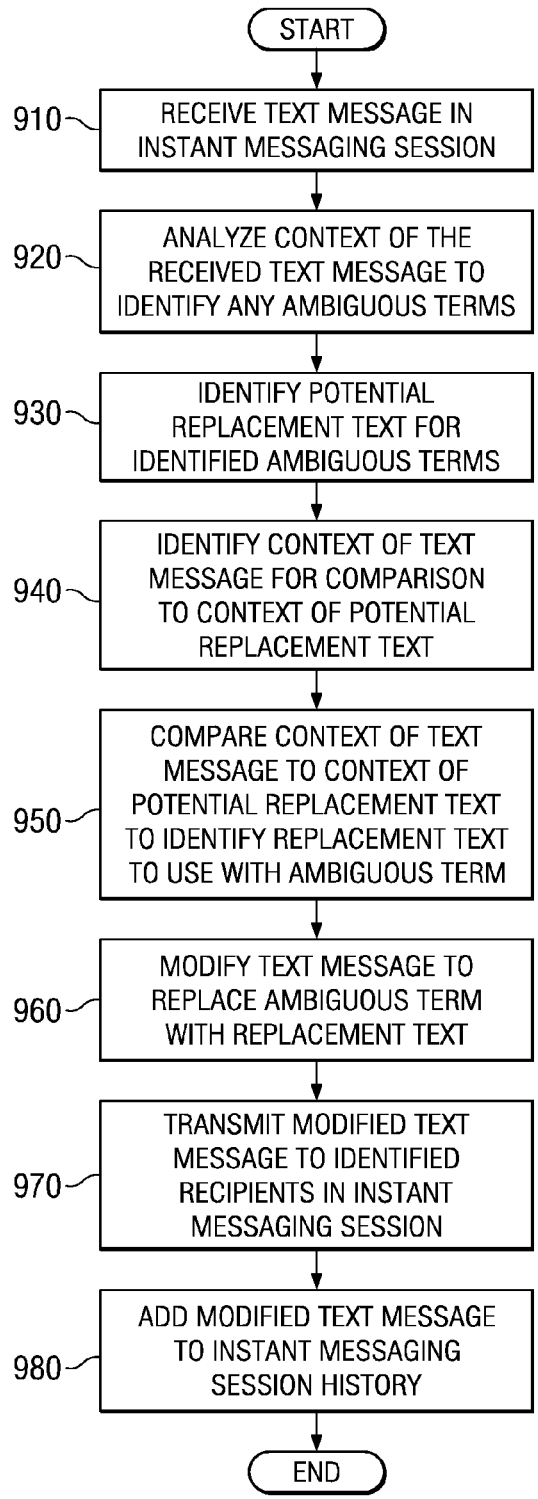

CONTEXT ENHANCED MESSAGING AND COLLABORATION SYSTEM

BACKGROUND

1. Technical Field

The present application relates generally to an improved data processing system and method. More specifically, the present application is directed to a context enhanced messaging and collaboration system.

2. Description of Related Art

Instant messaging is a relatively new technology that allows users to send textual messages virtually instantly to recipients via a communications network. Instant messaging differs from electronic mail services in that textual conversations are able to happen in realtime. Instant messaging requires the use of a client program that connects to an instant messaging service. Most services offer a presence information feature, indicating whether people on a user's list, i.e. a "buddy list," of contacts are currently online and available to chat.

In early instant messaging programs, each letter appeared as it was typed, and when letters were deleted to correct typographical errors, this was also seen in real time. This made early instant messaging programs more like a telephone conversation than exchanging letters. In modern instant messaging programs, the other party in the conversation generally only sees each line of text right after a new line is started. Most instant messaging applications today also include the ability to set a status message, roughly analogous to the message on a telephone answering machine, for informing other parties in an instant messaging session of a status of the party that is not available.

Instant messaging typically boosts communication and allows easy collaboration. In contrast to electronic mail messages or using the telephone, the parties of an instant messaging session know whether the other party is available. On the other hand, people are not forced to reply immediately to incoming messages. This way, communication via instant messaging can be less intrusive than communication via phone, which is partly a reason why instant messaging has become more and more important in corporate environments. In addition, the fact that instant messages typically are logged in a local message history closes the gap with the persistent nature of electronic mail messages, facilitating quick, safe, and persistent exchange of information.

Recently, improvements to instant messaging services have been developed to allow the users to share media files as part of an instant messaging session. For example, in U.S. Patent Application Publication No. 2005/0262204, a system is provided in which a user may share information about media that the user is listening to with other users in an instant messaging session via a status indicator. When other users in the instant messaging session select the status indicator, a media server may stream the same or similar media as the media to which the first user is listening, to the other users in the instant messaging session.

In U.S. Patent Application Publication No. 2005/0132056, GUI-based instant messaging mechanisms are described that support the processing of still images, real time images, text data, and information about particular users. Such instant messaging mechanisms support the exchange of attachments, which are electronic files such as images, documents, audio files, video files, or binary objects, which can be attached to an instant message and transmitted therewith from a sender to a recipient. For example, during an instant messaging exchange, in addition to seeing the text typed by a participant, a business user can view the video recording of a keynote speech, listen to the audio of a message recorded on a colleague's voicemail system, or simply receive such files as attachments to instant message communications.

While these mechanisms facilitate the communication of additional information beyond merely the text messages in an instant messaging session, they rely on the users themselves to locate the additional files, objects, etc., to be attached to the instant messages and to actually perform the active steps of attaching the files, objects, etc. to the instant messages, or setting the status indicator in the case of U.S. Patent Application Publication No. 2005/0262204. There is no mechanism for automatically identifying related files, objects, etc. and providing them to a user in an instant messaging session for exchange between the user and other users in the instant messaging session. Moreover, there is no mechanism for automatically exchanging such related files, objects, etc. between users in an instant messaging session without requiring user intervention.

SUMMARY

The illustrative embodiments provide a context enhanced messaging and collaboration system in which resources related to the context of text messages may be manually or automatically identified and exchanged between users in association with the text messages. In the illustrative embodiments, a graphical user interface is provided for instant messaging between a first user and one or more other users in an instant messaging session. The graphical user interface includes a resource pool section in which resources may be manually or automatically placed for use with the instant messaging session. Resources in the resource pool section may be manually or automatically sent to parties involved in the instant messaging session along with text messages. The graphical user interface further includes a display tray section for representing the resources that are currently being shared amongst the participants in the instant messaging session.

In one illustrative embodiment, a user may interact with the graphical user interface using a pointing device, keyboard, or any other generally known input device or combination of input devices, to manually add resources to, or remove resources from, the resource pool section of the graphical user interface. The manual addition or deletion of a resource from the resource pool section causes an update to a collected resources data structure that stores information about the resources that make up the resource pool section. Representations of the resources added to the resource pool section may be provided in the resource pool section of the graphical user interface along with representations of the particular types of inputs that cause the resources to be transmitted with the text messages to the other party or parties in the instant messaging session. For example, an audio file may be "dragged-and-dropped" by a user using a computer mouse into the resource pool section of the graphical user interface. A corresponding hot-key combination, such as "Shift-1" may be assigned to the audio file and the textual representation "Shift-1" may be displayed in association with the representation of the audio file in the resource pool section of the graphical user interface. Thereafter, if the user inputs the hot-key combination "Shift-1" during the instant messaging session, the corresponding audio file will be sent to the other party or parties of the instant messaging session along with the next completed text message.

In other illustrative embodiments, the graphical user interface may operate in conjunction with a context analysis engine that automatically analyzes the context of the textual messages being exchanged between the users and retrieves electronic files, objects, and the like (collectively referred to herein as "resources"), that correspond to the detected context. Representations of these automatically identified resources may be presented to the user via the resource pool section of the graphical user interface such that the resources may be exchanged between users involved in the instant messaging session.

The graphical user interface provides an instant messaging history section, a current textual message section, a display tray section, and a resource pool section. As messages are exchanged between users and added to the instant messaging history section, the instant messaging history section is analyzed to determine the context of the conversation between the users. For example, keywords are extracted and combinations of terms are analyzed to determine the general context of the conversation. The context is then used to match context with metadata of resources from one or more resource sources. The one or more resource sources may include, for example, the client device upon which the graphical user interface is provided, known sources of image files, audio files, audio-video files, and the like, on a communications network, e.g., Internet Websites, and the like. The mechanisms of the illustrative embodiments may interface with an Internet search engine, for example, to facilitate the identification of resources matching the identified context of the instant messaging session.

Resources that have a matching context may be identified and information about those resources may be added to a collected resources data structure. The collected resources data structure may then be used to populate the resource pool section of the graphical user interface. This context analysis and resource collection may be performed automatically and dynamically as the instant messaging session progresses with the collected resources data structure being dynamically updated.

The resource pool section may have a plurality of subsections for various different types of resources identified through the context analysis and resource collection operation. For example, a first sub-section may comprise image files, a second sub-section may comprise audio files, a third sub-section may comprise audio-video files, and the like. Each resource identified through the context analysis and resource collection operation may be represented in these sub-sections according to the type of resource that they are, e.g., .bmp, .jpg, .wav, .avi, or the like. The representation may take any of a plurality of different forms including textual description, thumbnail image, waveform image, or the like.

The user of the graphical user interface may enter textual messages into the graphical user interface using an editor provided as part of the current message section of the graphical user interface. In addition, the user may select individual ones of the resources identified in the resource pool section for sharing with the other users involved in the instant messaging session. For example, the user may use a pointing device, or designated key or combination of keys, to select an image and/or audio resource from the resource pool section and the selected image and/or audio resource is then represented in the display tray section of the graphical user interface. The resources whose representation are in the display tray section of the graphical user interface are the resources that are to be shared or are currently being shared with the other users in the instant messaging session.

In response to the selection of a resource to be shared with the other users in the instant messaging session, upon input of a send command, the selected resource is sent along with the textual message to the identified recipient users in the instant messaging session. The selected resource is further represented in the display tray so that the current user may know what resources are currently being shared with the other users.

In a further illustrative embodiment, the graphical user interface provides a slideshow option for sending collected resources, which are collected either manually by the user or automatically using a context analysis engine, to the other users in the instant messaging session. The slideshow option, when selected by a user, causes a next resource, or randomly selected resource, from the collected resources data structure to be sent to the identified users in the instant messaging session when a send command is entered by the current user. Thus, for example, when the current user enters a textual message and presses the "enter" key to send the textual message, in addition to the textual message, a next resource, or randomly selected resource, from the collected resources data structure, and hence the resource pool section of the graphical user interface, is sent along with the textual message to the identified users in the instant messaging session.

In other illustrative embodiments, rather than only performing context analysis on the history text of the instant messaging session, i.e. the text messages that have already been exchanged between the parties, context analysis may be performed on the individual text messages as they are being composed. Such individual message context analysis may be performed in addition to the history text context analysis or may be performed on its own without history text context analysis influencing the resources that are identified. In one illustrative embodiment, individual text message context analysis may be used to identify particular resources in the resource pool, i.e. in the collected resources data structure, that should be exchanged with the individual text message that is the subject of the context analysis. In this way, an automatic identification of a most appropriate resource to share with the parties of the instant messaging session may be determined on an individual text message by text message basis.

In still other illustrative embodiments, resources may be identified manually or automatically in the manners described above, and the resources or links to the resources may be inserted automatically inline in the text messages of the instant messaging session. Such inline insertion may be performed at a location within the text message that is in close proximity to the particular terms or keywords that are most relevant to the resource or link to the resource that is being inserted. For example, if a spreadsheet file is determined to be a resource that matches the context of a particular text message, as determined based on any of the context analysis mechanisms of the illustrative embodiments, then a link to the spreadsheet file may be automatically inserted next to the term "spreadsheet" in a text message that is being transmitted to the other parties of the instant messaging session. The other parties may then select the link in the received text message to thereby access the spreadsheet file.

In yet another illustrative embodiment, the mechanisms of the illustrative embodiments may provide a mechanism for disambiguation of terms in the text messages being exchanged between parties of an instant messaging session. For example, the context analysis mechanisms of the illustrative embodiments may be used to identify acronyms or other ambiguous terms in the text messages and determine the most appropriate non-ambiguous terms to replace them based on the determined context of the instant messaging session and/or the individual textual messages. Thus, for example, if a user uses the acronym "IBM" in an instant messaging session, the acronym may refer to International Business Machines, Inc. or International Brotherhood of Magicians, among others.

Based on the context of the instant messaging session and/or the individual text message, the mechanisms of the illustrative embodiments may automatically replace the term "IBM" in the text message, or provide a selectable identifier for identifying a non-ambiguous term, such as a drop-down or pop-up menu, with one of these non-ambiguous terms. If the context of the instant messaging session and/or the text message indicates that a computer architecture is being discussed, then the term "IBM" may be replaced with "International Business Machines, Inc." If the context indicates that a particular illusion or stage performance technique is being discussed, then the term "IBM" may be replaced with the term "International Brotherhood of Magicians."

In one illustrative embodiment, a computer program product comprising a computer useable medium having a computer readable program is provided. The computer readable program, when executed on a computing device, causes the computing device to generate a graphical user interface for performing instant messaging between the computing device and one or more other computing devices. The computer readable program further causes the computing device to receive input from a user via the graphical user interface and attach a resource to a text message to be exchanged between the computing device and the one or more other computing devices based on the input from the user. The graphical user interface may comprise a resource pool section having representations of resources related to a context of a current instant messaging session. The resource pool section of the graphical user interface may have a plurality of sub-sections. Each sub-section may be associated with a different type of resource.

The resource that is attached to the instant message may be selected from the resource pool section of the graphical user interface. Moreover, the resource that is attached to the text message may be selected based on a randomly selection of a representation of the resource from representations of resources in the resource pool section of the graphical user interface.

The input from the user may be a user selection of the resource from the resource pool section of the graphical user interface. The input from the user may be a drag-and-drop operation for adding a representation of a resource to the resource pool section of the graphical user interface.

The computer readable program may further causes the computing device to analyze a context of one or more text messages of the current instant messaging session and perform a search for one or more resources having a similar context to the context of the one or more text messages of the current instant messaging session. The resource pool section of the graphical user interface may be automatically populated with representations of the one or more resources having a similar context to the context of the one or more text messages of the current instant messaging session.

The computer readable program may cause the computing device to analyze a context of the one or more text messages by extracting keywords from the one or more text messages in an instant messaging session history data structure. The computer readable program may cause the computing device to perform a search for one or more resources having a similar context to the context of the one or more text messages of the current instant messaging session by performing a search of metadata associated with resources using the extracted keywords.

The graphical user interface may further include a display tray section. A representation of a resource currently being shared between the computing device and at least one other computing device may be provided in the display tray section of the graphical user interface.

The computer readable program may further causes the computing device to associate a command with one or more of the representations of resources in the resource pool section of the graphical user interface, and wherein in response to the user input being the command, an associated resource is attached to a current text message of the current instant messaging session.

The graphical user interface may further comprise a slideshow control element. In response to user selection of the slideshow control element, a next resource in a sequence of representations of resources in the resource pool section of the graphical user interface may be selected for attachment to each subsequent text message transmitted by the computing device during the current instant messaging session.

The computer readable program may cause the computing device to attach the resource to the text message by inserting the resource or a reference to the resource in the text of the text message prior to transmitting the text message to the one or more other computing devices.

The computer readable program may further cause the computing device to identify an ambiguous term in the text message, identify replacement text for the ambiguous term, and replace the ambiguous term with the replacement text prior to transmission of the text message to the one or more other computing devices. The computer readable program may cause the computing device to identify replacement text for the ambiguous term by analyzing a context of one or more text messages of the current instant messaging session and selecting replacement text having an associated context that is similar to the context of the one or more text messages of the current instant messaging session.

In other illustrative embodiments, a system for context based instant messaging is provided. The system may comprise a processor and a memory coupled to the process. The memory may contain instructions, which when executed by the processor, cause the processor to perform various ones, and combinations of, the operations outlined above with regard to the computer program product illustrative embodiment.

In yet other illustrative embodiments, a method for context based instant messaging is provided. The method may comprise generating a graphical user interface for performing instant messaging between the computing device and one or more other computing devices and receiving input from a user via the graphical user interface. The method may further comprise attaching a resource to a text message to be exchanged between the computing device and the one or more other computing devices based on the input from the user. The graphical user interface may comprise a resource pool section having representations of resources related to a context of a current instant messaging session. The resource that is attached to the instant message may be selected from the resource pool section of the graphical user interface. The method may further comprise other various operations, and combinations of operations, similar to those set forth above with regard to the computer program product illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart outlining an exemplary operation for performing inline text information insertion of instant messages in accordance with one illustrative embodiment;

FIG. 9 is a flowchart outlining an exemplary operation for performing disambiguation of terms in an instant message in accordance with one illustrative embodiment.

DETAILED DESCRIPTION OF THE PREFERRED EMBODIMENTS

The illustrative embodiments provide a context enhanced messaging and collaboration system in which resources related to the context of text messages may be automatically identified and exchanged between users in association with the text messages. The mechanisms of the illustrative embodiments are preferably implemented in a distributed data processing system in which a plurality of computing devices communicate with one another via one or more communications networks using an instant messaging service. Thus, in order to provide an environmental context in which the illustrative embodiments may be implemented, a description of a general distributed data processing environment and computing device architecture is provided in FIGS. 1-2 hereafter.

Figure 1:
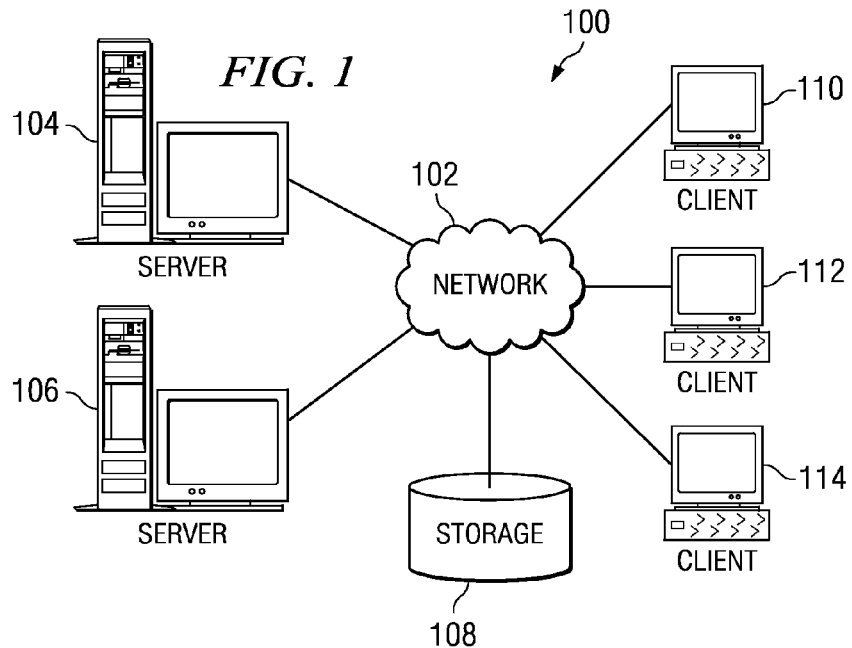
FIG. 1 depicts a pictorial representation of an exemplary distributed data processing system in which aspects of the illustrative embodiments may be implemented.
Figure 2:
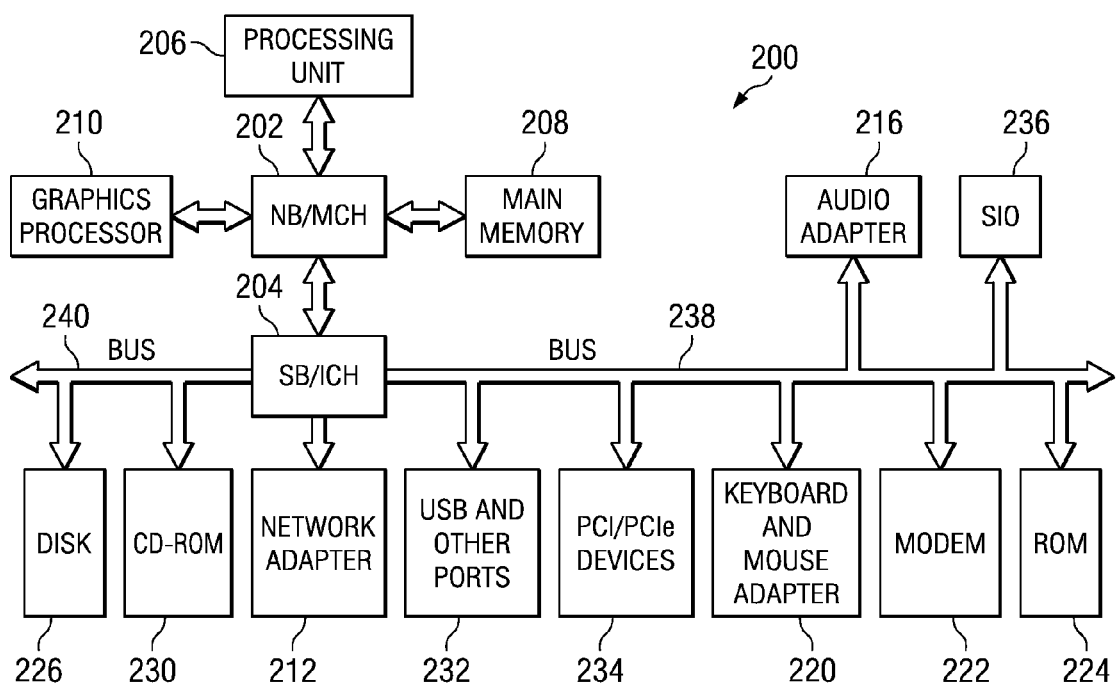
FIG. 2 is a block diagram of an exemplary data processing system is shown in which aspects of the illustrative embodiments may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, with regard to the illustrative embodiments described herein, client devices 110, 112 and 114 preferably execute client side instant messaging software providing the mechanisms of the illustrative embodiments described hereafter. The client devices 110, 112 and 114 may communicate with one another using instant messaging and an instant messaging service provided, for example, by software executing on server 104 or 106. Moreover, server 104, server 106, and/or network attached storage device 108, along with client devices 110, 112 and 114, may operate as sources of resources, e.g., files, objects, and the like, that may be manually and/or automatically identified and shared amongst participants of an instant messaging session in accordance with the illustrative embodiments as described hereafter.

The illustrative embodiments provide a context enhanced messaging and collaboration system in which resources related to the context of text messages being exchanged between client devices, such as client devices 110 and 114, may be manually and/or automatically identified and exchanged in association with the text messages. In the illustrative embodiments, a graphical user interface is provided for instant messaging between a first participant and one or more other participants in an instant messaging session. The graphical user interface includes a resource pool section in which resources may be manually or automatically placed for use with the instant messaging session. Resources in the resource pool section may be manually or automatically sent to parties involved in the instant messaging session along with text messages. The graphical user interface further includes a display tray section for representing the resources that are currently being shared amongst the participants in the instant messaging session.

In one illustrative embodiment, a user may interact with the graphical user interface using a pointing device, keyboard, or any other generally known input device or combination of input devices, to manually add resources to, or remove resources from, the resource pool section of the graphical user interface. The manual addition or deletion of a resource from the resource pool section causes an update to a collected resources data structure that stores information about the resources that make up the resource pool section. Representations of the resources added to the resource pool section may be provided in the resource pool section of the graphical user interface along with representations of the particular types of inputs that cause the resources to be transmitted with the text messages to the other party or parties in the instant messaging session. For example, an audio file may be "dragged-and-dropped" by a user using a computer mouse into the resource pool section of the graphical user interface. A corresponding hot-key combination, such as "Shift-1" may be assigned to the audio file and the textual representation "Shift-1" may be displayed in association with the representation of the audio file in the resource pool section of the graphical user interface. If, during the instant messaging session, the user inputs the hot-key combination "Shift-1", or selects the representation of the audio file from the resource pool section of the graphical user interface using a pointing device or the like, the corresponding audio file will be sent to the other party or parties of the instant messaging session along with the next completed text message.

In some illustrative embodiments, the graphical user interface operates in conjunction with a context analysis engine, provided in the client devices 110 and 114, for example, that automatically analyzes the context of the textual messages being exchanged between the participants and retrieves electronic files, objects, and the like (herein referred to as "resources"), that correspond to the detected context. Representations of these automatically identified resources may be presented to the participants via the resource pool section of the graphical user interface such that the resources may be exchanged between participants involved in the instant messaging session.

The graphical user interface may provide an instant messaging history section, a current textual message section, a display tray section, and a resource pool section. These sections may have associated data structures maintained in the client device that store the data for representing these sections as part of the instant messaging graphical user interface. For example, the instant messaging history section may have an associated history data structure that stores the data corresponding to the text messages, and any attachments, that have been exchanged between the participants in the instant messaging session. Similarly, the resource pool section may have an associated collected resources data structure that stores the resources themselves or at least a reference to the resources that may be used to access the actual resources at their storage location.

As messages are exchanged between users and added to the instant messaging history section, this section may be analyzed to determine the context of the conversation between the participants. For example, keywords may be extracted and combinations of terms may be analyzed to determine the general context of the conversation. The context may then be used to match context with metadata of resources from one or more resource sources. The one or more resource sources may include, for example, the client device upon which the graphical user interface is provided, e.g., client devices 110, 112, and/or 114, known sources of image files, audio files, audio-video files, and the like, on the communications network, e.g., Internet Websites which may be provided, for example, by servers 104 and 106, and/or storage device 108, and the like. The mechanisms of the illustrative embodiments may interface with an Internet search engine, for example, to facilitate the identification of resources matching the identified context of the instant messaging session.

Resources that have a matching context may be identified and information about those resources may be added to a collected resources data structure maintained on the client computing device 110, 112, and/or 114. The collected resources data structure may then be used to populate the resource pool section of the graphical user interface. This context analysis and resource collection may be performed automatically and dynamically as the instant messaging session progresses with the collected resources data structure being dynamically updated.

The resource pool section may have a plurality of sub-sections for various different types of resources identified through the context analysis and resource collection operation. For example, a first sub-section may comprise image files, a second sub-section may comprise audio files, a third sub-section may comprise audio-video files, and the like. Each resource identified through the context analysis and resource collection operation may be represented in these sub-sections according to the type of resource that they are, e.g., .bmp, .jpg, .wav, .avi, or the like. The representation may take any of a plurality of different forms including textual description, thumbnail image, waveform image, or the like.

The user of the graphical user interface, i.e. a first participant in the instant messaging session, may enter textual messages into the graphical user interface using an editor provided as part of the current message section of the graphical user interface. In addition, the user may select individual ones of the resources identified in the resource pool section for sharing with the other users involved in the instant messaging session. For example, the user may use a pointing device, or designated key or combination of keys, to select an image and/or audio resource from the resource pool section and the selected image and/or audio resource is then represented in the display tray section of the graphical user interface. The resources whose representation are in the display tray of the graphical user interface are the resources that are to be shared or are currently being shared with the other users in the instant messaging session.

In response to the selection of a resource to be shared with the other participants in the instant messaging session, upon input of a send command, the selected resource is sent along with the textual message to the identified recipients in the instant messaging session. The selected resource is further represented in the display tray section so that the current user may know what resources are currently being shared with the other participants.

In a further illustrative embodiment, the graphical user interface may provide a slideshow option for sending collected resources to the other participants in the instant messaging session. The slideshow option, when selected by a user, causes a next resource, or randomly selected resource, from the collected resources data structure to be sent to the identified users in the instant messaging session when a send command is entered by the current user. Thus, for example, when the current user enters a textual message and presses the "enter" key to send the textual message, in addition to the textual message, a next resource, or randomly selected resource, from the collected resources data structure is sent along with the textual message to the identified users in the instant messaging session.

As an example of the operation of the present invention, assume that a first participant, Frank, wishes to communicate using instant messaging with a second participant, Darren. Frank may initiate the instant messaging client agent on his client device 110 and determine whether Darren is currently available for instant messaging. Such presence detection ability is generally known in the art and is one of the services that is provided by known instant messaging services. In this example, it will be assumed that the instant messaging client agent running on client device 110 logs into an instant messaging service provided by server 104, for example, in a manner generally known in the art.

Frank may initiate a conversation with Darren by entering instant message text into his instant messaging client agent's current message section of the graphical user interface and selecting a send operation, such as by pressing an "enter" key or the like. In response to the sending of the message, a copy of the text message is added to the instant messaging session history and displayed in the instant messaging client agent's history section of the graphical user interface.

Frank may further decide to populate the resource pool section of his instant messaging graphical user interface with resource pertaining to the instant messaging conversation that he plans to have with Darren. Frank may manually populate this resource pool section of his instant messaging graphical user interface, for example, by dragging and dropping files from his file system into the resource pool section of the instant messaging graphical user interface using a pointing device such as a computer mouse. Other alternative mechanisms for inserting resources into the resource pool section may include entering a filepath for the resource into an appropriate interface, and the like. Regardless of the particular mechanism used for manually populating the resource pool section of the graphical user interface, a representation of the resource is generated and provided as part of the resource pool section of the graphical user interface, e.g., a thumbnail image, a waveform representation of the audio file, an iconic representation of the type of the resource along with a name of the resource, or the like.

Once a resource is represented in the resource pool section of the graphical user interface, the user, e.g., Frank, may manually select resources from the resource pool for attaching to text messages in the instant messaging session. In one illustrative embodiment, resources placed in the resource pool section, or resources of a certain type, e.g., audio files, placed in the resource pool section, may be automatically assigned a hotkey combination for selection of the resource. If Frank enters the appropriate hotkey combination during the instant messaging session, the corresponding resource is selected for attachment to the currently composed text message. Alternatively, Frank may select the resource using a pointing device by clicking on the resource's representation in the resource pool section of the graphical user interface. The resource will then be attached to the currently composed text message and sent to the designated parties involved in the instant messaging session when Frank enters the send command for sending the currently composed message.

In addition to, or in replacement of, the manual process for populating and attaching resources to text messages of an instant messaging session, the illustrative embodiments further provide a mechanism for performing automatic identification of resources to populate the resource pool section and to attach to text messages being exchanged during an instant messaging session. For example, in further illustrative embodiments, the instant messaging graphical user interface interacts with a context analysis engine to automatically determine which resources are relevant to a current instant messaging session.

In such embodiments, after a text message has been added to the history section of the graphical user interface, the text of the instant message may be analyzed by a context analysis engine associated with Frank's client device 110 to determine the context of the instant message. For example, if Frank sends a message "I just got back from my Christmas vacation in Florida" then the context analysis engine may extract keywords from this message including "Christmas," "vacation," and "Florida." These keywords may be used as a basis for searching the metadata of resources to identify resources related to "Christmas," "vacation," and "Florida."

In this example, only Frank's client device 110 is searched using the context analysis engine, however, the illustrative embodiments are not limited to such. Rather, the context analysis engine may interface with a textual search engine for entering keywords and appropriate connector words, e.g., "Christmas and vacation and florida," to search for resources available from sources over the communications network, e.g., Websites or known sources of images, audio, and video files. Results of the search may be added to the collected resources data structure maintained in Frank's client device 110 in association with the context analysis engine. The results may be ranked based on a relative degree of matching of the resources' metadata to the keywords. Such ranking is generally known in the art of Internet based search engines.

The context analysis performed by the context analysis engine is dynamic and is constantly being updated as the instant messaging session progresses. Thus, if Darren responds to Frank's initial message with a text message "what did you do over there?" and Frank responds with "So a lot of the time we just stayed on the beach," the context analysis engine may update its search criteria to include the keyword "beach." Moreover, if Frank adds a text message "but we also did all the theme parks, wallyworld, isles of wonder..." then the keywords "theme parks," "wallyworld," and "isles of wonder" may be extracted by the context analysis engine and used as a basis for updating the search for context related resources.

Information about the resources found during the context based search may be added to the resources pool section of the graphical user interface provided by the instant messaging client agent on the client device 110. Such information may include representations of the resources, for example, textual descriptions, thumbnail images, waveform images, icons, other types of textual and/or graphical representations, or the like. The information presentation may itself be ranked based on the relevance of the collected resource to the keywords extracted by the context analysis engine. The user may rearrange this ranked presentation of resources through the graphical user interface, such as by way of a drag-and-drop operation, for example.

The user, e.g., Frank, may select resources from this collected resources portion of the graphical user interface as the user submits textual messages to be sent to the other participants, e.g., Darren. Thus, for example, when Frank submits the message "but we also did all the theme parks, wallyworld, isles of wonder . . . " he may select, such as via a pointing device, key input, combination of key inputs, or the like, an image file of a picture of the entrance to Wally World in Orlando, Fla. The selected image may be added to the display tray section of the graphical user interface and attached to the instant message that is sent from Frank's client device 110 to Darren's client device 114.

In addition, or alternatively, Frank may select an audio file entitled "holidaymusic.mp3" for transmission to Darren's client device 114 along with, or in replacement of, the picture of the entrance to Wally World since the instant messaging conversation is directed to Frank's holiday vacation. By attaching the audio file, Frank will cause the audio file to be audibly output on Darren's machine when it is received as an attachment to the instant message. Likewise, the audio file may be played on Frank's machine in response to the sending of the audio file as an attachment to a text message so that both Frank and Darren may experience the attached resources virtually simultaneously. The representation of the audio file in the display tray section may include a name of the audio file, a progress bar for the playback of the audio file, controls for controlling the playback of the audio file, or the like.

Resources that are present in the display tray section are currently being shared amongst the identified participants in the instant messaging session. Thus, once Frank selects the picture of the entrance to Wally World and/or the holidaymusic.mp3 audio file, these resources will be represented in the display tray section of Frank's instant messaging client agent. Similarly, once Frank enters the send command, and the resources are received at Darren's client device 114, the same image and/or audio files will be represented in Darren's display tray section of his instant messaging client agent. In this way, Darren may view the picture of the entrance to Wally World and hear the playback of the holidaymusic.mp3 file while reading the textual message from Frank.

In another illustrative embodiment, rather than Frank having to select which resources to send to Darren during the instant messaging session, Frank may choose a slideshow option in his instant messaging client agent via the graphical user interface. The slideshow option initiates a mode of operation in which resources are added to the display tray section either in an order corresponding to the order of the resources in the resources pool section of the graphical user interface, in a random order, or the like. The slideshow option may be applied to all of the resources or a select sub-set of the resources, e.g., only the image files while audio files must be manually selected by the user, e.g., Frank.

The resources are added to the display tray section in response to the selection of a send operation, for example. That is, once Frank selects the send operation, the currently selected resource(s) is/are added to the display tray section and is sent to Frank's client device 114 along with the text message. Moreover, the automatic selection of a next resource to be added to the display tray may be made from the resource pool section of the graphical user interface as part of the slideshow operation. Upon selecting the send operation again, the now currently selected resource may be sent to Darren's client device 114 and the previous contents of the display tray section are replaced with the now currently selected resource. This operation may continue for the entire instant messaging session or until the slideshow option is de-selected.

In yet another illustrative embodiment, rather than requiring the user to select a resource that is most appropriate for the text message that is being sent, the context analysis engine may analyze the instant message that has been composed by the user in response to the entry of the send operation prior to actually sending the text message to the other participants in the instant messaging session. The context analysis engine may analyze the current text message for keywords and perform a search of the already collected resources to determine which resource is the most appropriate for the context of the text message. If none of the already collected resources has a match with the context of the current text message that is being sent within a given tolerance or ranking, then a default resource selection may be utilized, e.g., a next resource or randomly selected resource from the resource pool section may be sent.

Thus, a two step context analysis may be performed in which instant messages that are added to the history for the instant messaging session are used to identify resources to be added to the collected resources data structure and then instant messages that are being sent may be individually analyzed to determine which resources that have already been collected are most appropriate for sending with the individual text messages. This alleviates the burden of the user having to select a resource to add to an instant message and may increase the speed at which communication may take place.

Moreover, rather than automatically determining which resources to attach to instant messages, the mechanisms of the illustrative embodiments may further determine modifications to the actual text of the instant messages that may be appropriate based on the context of the instant messaging session and/or the individual text messages themselves. For example, such text message modifications may include insertions of resources or links to resources in the text of the text message themselves. Moreover, other illustrative embodiments may comprise modifications to text messages that include disambiguation of ambiguous terms in the text messages based on the determined context of the text messages.

Figure 3:
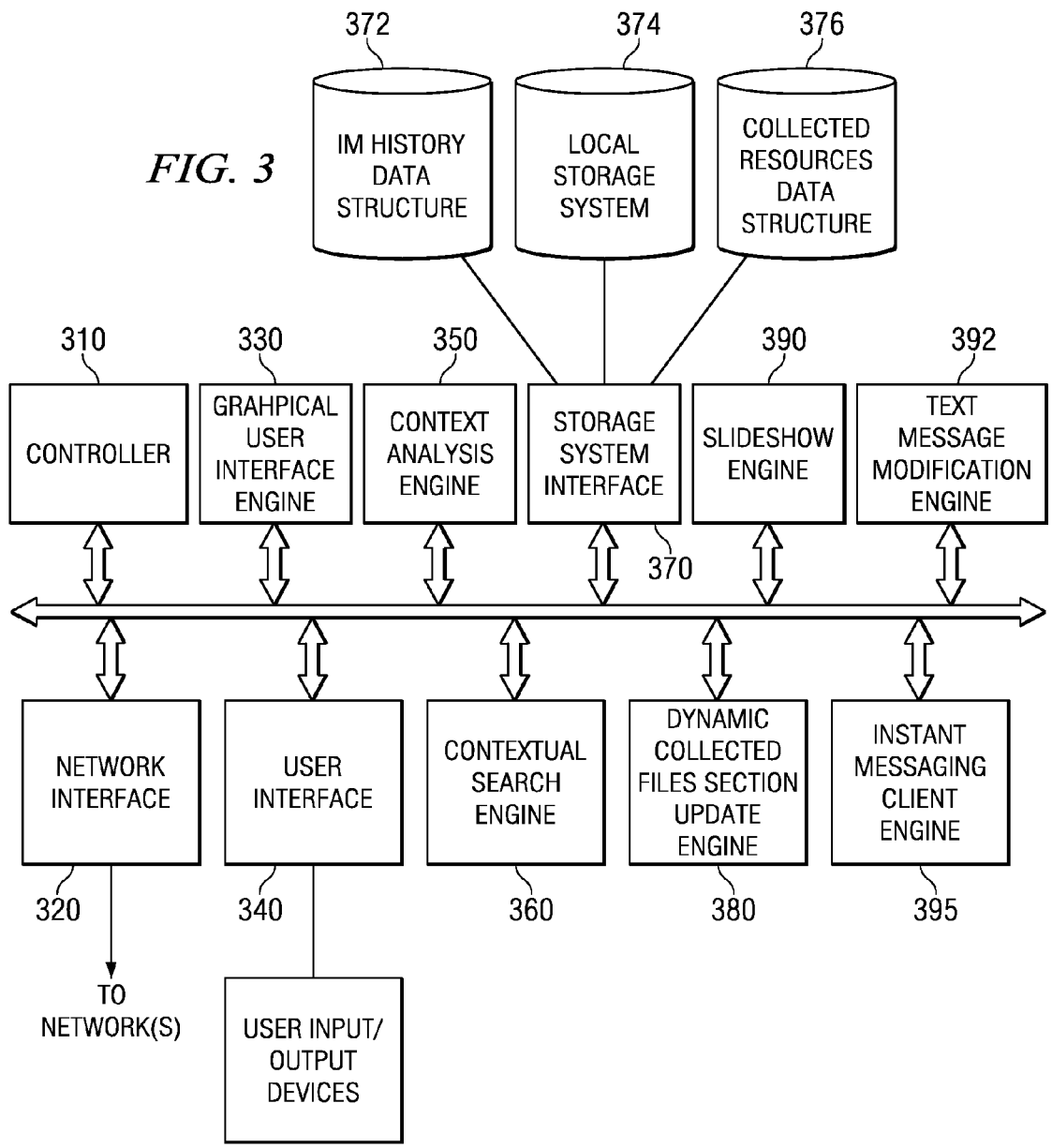
FIG. 3 is an exemplary block diagram of a context enhanced messaging and collaboration system in accordance with an illustrative embodiment.

FIG. 3 is an exemplary block diagram of a context enhanced messaging and collaboration system in accordance with an illustrative embodiment. The elements shown in FIG. 3 may be implemented in hardware, software, or any combination of hardware and software. In one illustrative embodiment, the elements shown in FIG. 3 are implemented as software instructions executed by one or more processing devices.

As shown in FIG. 3, the context enhanced messaging and collaboration system includes a controller 310, a network interface 320, a graphical user interface engine 330, a user interface 340, a context analysis engine 350, a contextual search engine 360, a storage system interface 370, a dynamic resource pool section update engine 380, a slideshow engine 390, a text message modification engine 392, and an instant messaging client engine 395. The elements 320-395 may operate and communicate with one another under the direction and orchestration of the controller 310, for example.

The network interface 320 provides a mechanism through which the context enhanced messaging and collaboration system may communicate with other computing devices via one or more communications networks. The context enhanced messaging and collaboration system logs onto the instant messaging service made available by a server computing device via the network interface 320. Instant messages and their associated attachments are sent to other instant messaging client agents on other computing devices via the network interface 320. Moreover, searches for context related resources may be performed via the network interface 320.

The graphical user interface engine 330 provides a mechanism through which a graphical user interface is provided to a user of the computing device for performing instant messaging in accordance with the illustrative embodiments. The graphical user interface engine 330 works in close association with the user interface 340, the dynamic resource pool section update engine 380, the slideshow engine 390, the text message modification engine 392, and the instant messaging client engine 395 to provide the graphical user interface to the user.

The user interface 340 provides a mechanism through which user inputs may be received and outputs to the user may be provided. The user interface 340 may be coupled to other devices for display of the graphical user interface generated by the graphical user interface engine 330, for example. The user interface 340 may be used by the user of the client device to enter text messages to be sent as instant messages to other client devices, input commands, such as the send command, select resources to add to an instant message, select resources to add to the resources pool section of the graphical user interface, and the like.

For example, using the user interface 340, a user may manually select resources to be included in the resource pool section of the graphical user interface. Such selection may involve, for example, performing a drag-and-drop operation for selecting, dragging, and dropping a representation of the resource from a file system interface to the resource pool section of the graphical user interface. Alternative mechanisms may be provided through the use interface 340 to select resources and add them to the resources pool section of the graphical user interface. Moreover, the user interface 340 may further be used to select resources from the resource pool section to attach to text messages of the instant messaging session.

The context analysis engine 350 provides a mechanism through which analysis of text messages may be performed to identify a context of the instant messaging session which may be used as a basis for identifying resources related to the context of the instant messaging session. The context analysis engine 350 parses the text messages that comprise the instant messaging history to determine a context for the instant messaging session. In parsing the text messages, the context analysis engine may extract keywords from the text messages and may optionally rank these keywords in accordance with frequency of use in the instant messaging session. These keywords, optionally ranked according to frequency of use, may be provided to the contextual search engine 360.

The contextual search engine 360 provides a mechanism through which a search for resources, e.g., files, objects, etc., having similar context to the identified context of the instant messaging session may be identified. The search performed by the contextual search engine 360 may be performed with regard to metadata associated with the resources. For example, the metadata associated with the resources may contain a listing of terms that are relevant to the content of the resource. These terms may be matched with the keywords extracted from the text messages stored as part of the history of the instant messaging session. Those resources that have terms that match keywords extracted from the text messages may be identified through the search performed by the contextual search engine 360 and information about those resources may be stored in a collected resources data structure.

As mentioned above, the context of the instant messaging session history may be dynamically analyzed as new text messages are added to the history. Thus, the listing of keywords, and optionally the ranking of keywords with regard to frequency of use, may be dynamically updated automatically by the context analysis engine 350 as text messages are exchanged between the participants in the instant messaging session. As a result, the searches performed by the contextual search engine 360 may be dynamically updated with new keywords or a new ranking of keywords.

In one illustrative embodiment, different searches may be performed for each of the individual keywords extracted from the instant messaging session history. The results of these different searches may be weighted based on the ranking of the keywords. In another illustrative embodiment, a plurality of keywords may be combined in a single search string with logical operators, e.g., AND, OR, etc., between the keywords. The order of the keywords in the search string may be based on the ranking of the keywords determined based on frequency of use in the instant messaging session.

The contextual search engine 360 may search a number of different resource sources. In one illustrative embodiment, the contextual search engine 360 only searches the local storage devices of the client computing device upon which the contextual search engine 360 is implemented. For example, the contextual search engine 360 may search metadata regarding files and objects stored on a local storage device via the storage system interface 370.

Alternatively, in another illustrative embodiment, the contextual search engine 360 may search a number of different resource sources made available through one or more communications networks via the network interface 320. Certain resource sources on the one or more networks may be pre-known to the contextual search engine 360 and thus, these resource sources may be searched directly by the contextual search engine 360. Alternatively, or in addition, the contextual search engine 360 may interface with network based search engines via the network interface 320 to perform keyword searches and identify resources having a degree of matching above a predetermined threshold. As is generally known in the art, network based search engines have facilities for identifying a degree of matching of network sites to search terms. This degree of matching may be compared to a threshold to identify which search results to retrieve and include in the collected resources data structure.

The storage system interface 370 provides a mechanism for accessing a local storage system 374 of a client device upon which the context enhanced messaging and collaboration system operates. Moreover, the storage system interface 370 may provide an interface to data structures utilized by the context enhanced messaging and collaboration system for maintaining instant messaging session histories and collected resources. For example, the storage system interface 370 may provide an interface for accessing an instant messaging session history data structure 372 and a collected resources data structure 374.

The dynamic resource pool section update engine 380 retrieves the information stored in the collected resources data structure and uses this information to populate the resource pool section of the graphical user interface provided by the graphical user interface engine 330. Since the content of the collected resources data structure may be dynamically updated based on changes to the instant messaging session history, as described above, the dynamic resource pool section update engine 380 may dynamically update the resource pool section of the graphical user interface as changes are made to the collected resources data structure.

The slideshow engine 390 provides a mechanism for attaching resources to text messages in an instant messaging session when a slideshow option is selected by a user. The slideshow engine 390 detects the input of a send operation by a user and, in response, attaches a next resource in a series of resources identified in the collected resources data structure, to the text message that is being sent. This operation may be repeated with each entry of the send operation by the user such that the next resource in the series is updated and sent with each subsequent text message.

As mentioned above, in one illustrative embodiment, rather than using the slideshow operation or requiring the user to specifically select resources to attach to a text message, a resource may be automatically identified through a second level context search of the text message being transmitted. In such an embodiment, the context analysis engine 350 may contain logic that controls the extraction of keywords from the text message being sent and that uses those keywords to search, via the contextual search engine 360, the already retrieved resources in the collected resources data structure. A top ranked resource may be selected and automatically attached, by the slideshow engine 390 or replacement logic, to the text message for sending to the recipient participant in the instant messaging session.

As mentioned above, in some illustrative embodiments, resources are identified, either manually or automatically through context analysis, and attached to instant messages that are transmitted between participants in an instant messaging session. In addition, or alternatively, the illustrative embodiments further provide a mechanism, i.e. the text message modification engine 392, for modifying the text messages based on the context of the instant messaging session and/or the context of the text message itself. The text message modification engine 392 may identify particular keywords in text messages, based on analyzed context of the instant messaging session and/or the individual text message itself, and resources associated with that keyword. The text message modification engine 392 may automatically insert the identified resources, or links to the resources, into the text message itself before transmitting it to the other participants in the instant messaging session.

In other illustrative embodiments, the context analysis engine 350 may be used to identify ambiguous terms, e.g., acronyms, and the like, that may be made more explicit. For example, the context analysis engine 350 may identify acronyms in the text message, perform a context search based on the acronym and other keywords from the instant messaging session and/or the text message, and then determine a most appropriate non-ambiguous representation of the acronym to replace the acronym in the text message.

Thus, for example, if a user uses the acronym "IBM" in an instant messaging session, the acronym may refer to International Business Machines, Inc. or International Brotherhood of Magicians, among others. Based on the context of the instant messaging session and/or the individual text message, the mechanisms of the illustrative embodiments may automatically replace the term "IBM" in the text message, or provide a selectable identifier for identifying a non-ambiguous term, such as a drop-down or pop-up menu, in association with one of these non-ambiguous terms. If the context of the instant messaging session and/or the text message indicates that a computer architecture is being discussed, then the term "IBM" may be replaced with "International Business Machines, Inc." If the context indicates that a particular illusion or stage performance technique is being discussed, then the term "IBM" may be replaced with the term "International Brotherhood of Magicians."

The instant messaging client engine 395 provides a mechanism for actually performing instant messaging between participants in the instant messaging session. The instant messaging client engine 395 provides the various functionalities required to log onto an instant messaging service provider's server, submit instant messages, receive instant messages, and other instant messaging functions generally known in the art. Once an instant message is composed by the user and appropriate attachments are identified using one or more of the illustrative embodiments described above, the instant messaging client engine 395 is responsible for sending the composed instant message as well as receiving instant messages from other participants and providing the instant messages and their attachments to the controller 310 for processing.

It should be appreciated that other participants in the instant messaging session may also have a similar context enhanced messaging and collaboration system. Thus, similarly enhanced instant messages may be received from other participants in the instant messaging session. In response to receipt of an instant message, the instant message is provided, by the controller 310, to the graphical user interface engine 330 which generates an appropriate display of the received message in the graphical user interface as well as an output of any received attachments to the instant message, e.g., audio, video, or image files. Furthermore, any received attachments may be stored in a temporary storage and added to the collected resources data structure such that they may be added to the resource pool section of the graphical user interface. In this way, the recipient of the attachments may utilize the attachments that were received in future text messages during the instant messaging session.

Figure 4:
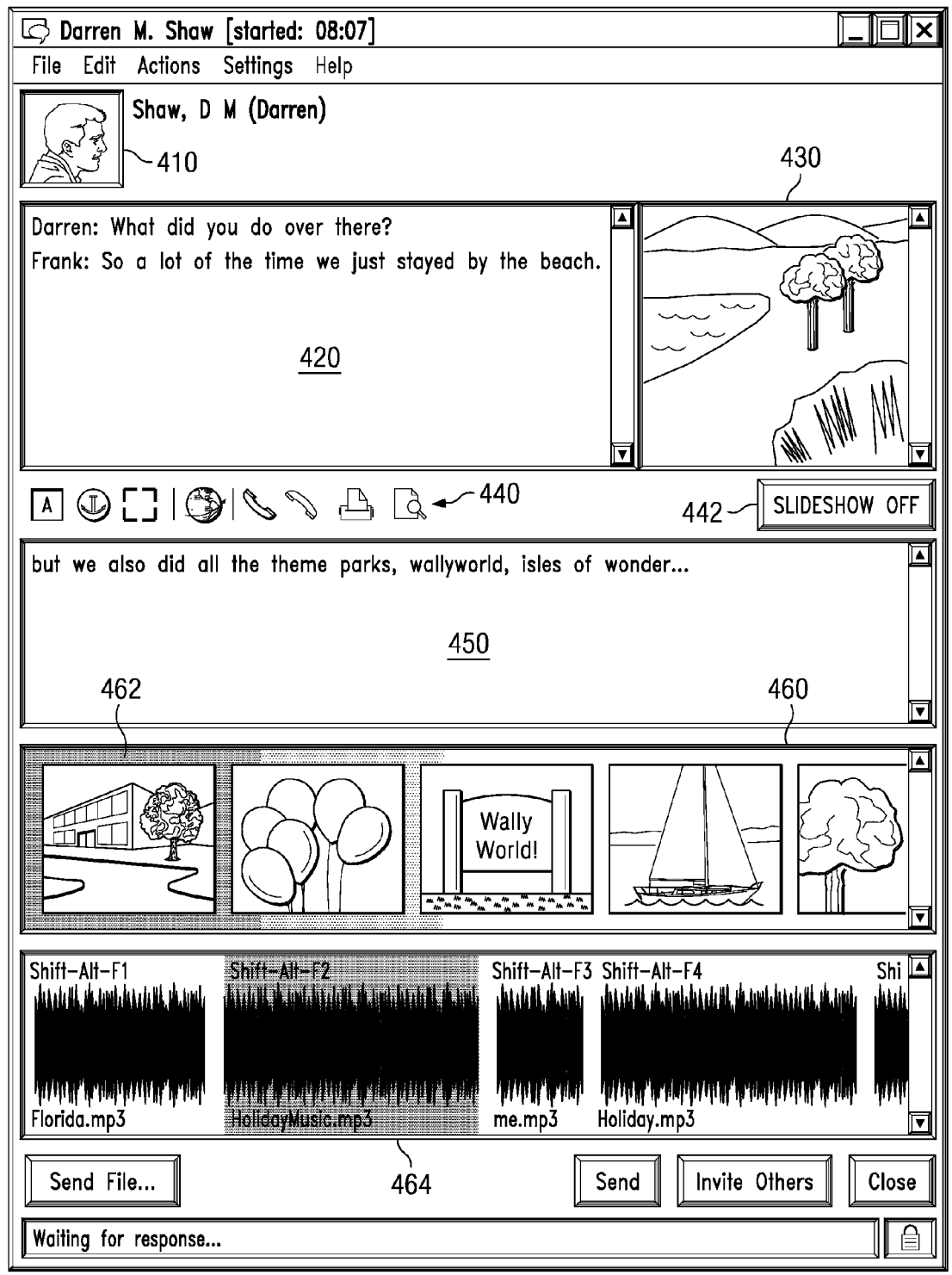
FIG. 4 is an exemplary diagram of a graphical user interface in accordance with one illustrative embodiment.

FIG. 4 is an exemplary diagram of a graphical user interface in accordance with one illustrative embodiment. As shown in FIG. 4, the graphical user interface includes a participant identification section 410, an instant messaging history section 420, a display tray 430, a toolbar 440, a current text message section 450, and a resource pool section 460, among other graphical user interface elements. The participant identification section 410 provides an identifier of the remotely located participant with which the current user is communicating via the instant messaging session. The participant identification section 410 may include, for example, a name of the participant and an image, icon or other graphical representation of that participant. The participant identification section 410 may further be used to select a participant to which an instant message is to be sent in the case of an instant messaging session involving more than two participants.

The instant messaging history section 420 contains a transcript of the instant messages that have been exchanged between the participants. The messages may have associated identifiers to identify which participant submitted the text message in the history. Text messages in the instant messaging history that are used to populate this the instant messaging history section 420 may be analyzed by the context analysis engine to identify resources that are to be added to the collected resources data structure and thus, represented in the resource pool section 460.

The display tray 430 provides a section of the graphical user interface where a representation of a resource that is currently being shared between participants may be provided. For example, the display tray 430 displays representations of any image, audio, video, or other types of resources that were attached to a last text message exchanged between the participants, i.e. the last text message in the instant messaging history section 420. In the case of audio files, an indicator of the audio file being played may be provided in the display tray 430 either by itself or in addition to a displayed image.

The toolbar 440 provides a number of graphical user interface elements for invoking various functions of the instant messaging client agent. In addition, the toolbar 440 includes a slideshow enable/disable virtual button 442 for enabling or disabling a slideshow operation with regard to attachments to text messages generated in the current text message section 450 and transmitted to the other participant in the instant messaging session. In the depicted example, the slideshow operation is currently set to "slideshow off" but may be changed to "slideshow on" in response to the user selecting the virtual button 442.

The current text message section 450 provides an editor through which a user may enter a text message for transmission to another participant in the instant messaging session. The user may enter text into this section 450 using a standard keyboard, for example, and then submit a send command, such as by pressing the "enter" key, selecting a "Send" virtual button in the graphical user interface, or the like. In response to the send command being submitted, the text entered into the current text message section 450 is sent to the other participant's client device along with any attachments selected by the user, selected as part of the slideshow operation, selected randomly, or selected automatically as part of an enhanced context search, for example. Moreover, the text message and any attachment references may be stored as part of an instant message history data structure for use in representing the instant messaging session history in the instant messaging history section 420.

The resource pool section 460 displays representations of resources identified as having contexts that match an identified context of the instant messaging session in the manner previously described above. The representations may take many different forms including thumbnail images, icons, waveform representations, textual descriptions, and the like. The user of the graphical user interface may select individual resources from the resource pool section 460 using a pointing device, designated key or combination of keys, or any other user input that may be used to specifically designate one resource as opposed to another. As shown in FIG. 4, some resources may be selected by way of a pointing device, e.g., the thumbnail images, while other resources may be selectable via a particular key combination, e.g., "Shift-Alt-F4". Moreover, some resources may be selectable by either the use of a pointing device or input of a particular key combination.

The resource pool section 460 may have sub-sections for each of the different types of resources that have been collected. For example, as shown in FIG. 4, a first sub-section 462 is comprised of all the image resources that were identified during the context search. A second sub-section 464 is comprised of all the audio file resources that were identified during the context search. The resources in the resource pool section 460 represent those resources that have either been manually added to the resource pool section 460 or have been automatically identified and added by way of a context analysis search, as described previously. Any combination of manually added and/or automatically added resources may be provided in the resource pool section without departing from the spirit and scope of the present invention.

The display of the instant messaging history section 420 is beneficial to provide a context of the instant messaging session to both the users and the context search engine of the illustrative embodiments. Because the text messages and references to resources attached to the text messages may be stored in the instant messaging history data structure, this section 420 of the graphical user interface may further be used to revisit resources that were previously output when a text message was originally received.

Thus, for example, as text messages are received and presented through the graphical user interface, the attachments are temporarily stored in a temporary storage local to the client device. A reference to this storage location may be stored in association with the text message in the instant messaging history data structure. A user may, via a pointing device or other input mechanism, select a text message in the instant messaging history section 420 and have the display tray 430 automatically updated locally to display the resource associated with the selected text message. In addition, any audio files may be output, such as via attached speakers, in response to the selection of the text message. In this way, not only can the user view the textual context of the instant messaging session, but may also revisit the attachments to instant messages in association with the text messages in the instant messaging session history. It should be appreciated that such updating of the display tray 430, in this case, is done only on the local client device and does not cause the display tray of the other participants to change.

Thus, the graphical user interface shown in FIG. 4 provides a mechanism through which instant messages may be exchanged between participants in an instant messaging session. The graphical user interface further facilitates the manual and/or automatic identification and association of resources with text messages of the instant messaging session. In this way, a context enhanced instant messaging system and method are provided by the mechanisms of the illustrative embodiments.

Figure 5:
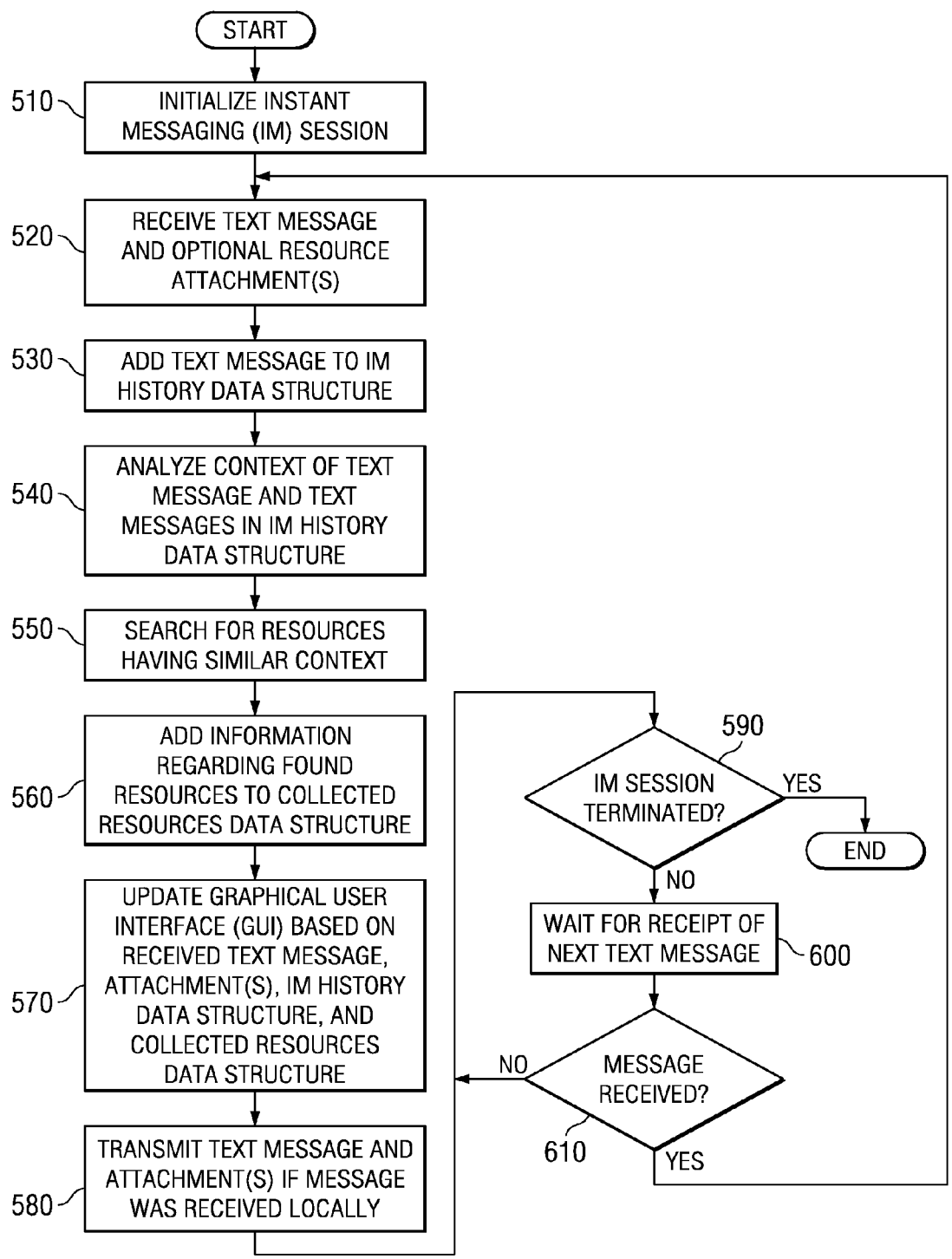
FIG. 5 is a flowchart outlining an exemplary operation for providing a context enhanced messaging graphical user interface in accordance with one illustrative embodiment.

FIG. 5 is a flowchart outlining an exemplary operation for providing a context enhanced messaging in accordance with one illustrative embodiment. It will be understood that each block of the flowchart illustration, the flowchart illustrations described hereafter, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 5, the operation starts with the initialization of an instant messaging session between two or more participants (step 510). A text message is received in the context enhanced messaging and collaboration system (step 520). The text message may be received either via input by a user that is local to the client device on which the context enhanced messaging and collaboration system is operating or may be received from a remotely located participant via one or more networks. The context enhanced messaging and collaboration system adds the text message to an instant messaging history data structure (step 530) and a context analysis engine of the context enhanced messaging and collaboration system analyzes the text message, possibly along with other text messages in the instant messaging history data structure, to determine a context of the text message (step 540).

A context search engine of the context enhanced messaging and collaboration system searches for resources having a matching, i.e. similar, context (step 550). The context search engine adds information regarding the resources having a matching context to a collected resources data structure (step 560). A graphical user interface is updated based on the received message, any attachments it may have, the instant messaging history data structure, and the collected resources data structure (step 570). If the text message was received from a local user, such as via user input to a current text message section of the graphical user interface, the context enhanced messaging and collaboration system may then transmit the text message to a remote user via one or more networks (step 580).

The context enhanced messaging and collaboration system may then determine if the instant messaging session has been terminated (step 590). Such termination may be performed, for example, by input of a "close" command, or other appropriate command, by a user. If the instant messaging session has been terminated, the operation ends. Otherwise, the context enhanced messaging and collaboration system waits for receipt of another text message (step 600). If a text message is received (step 610), the operation returns to step 520. If a text message is not received, the operation returns to step 590.

It should be appreciated that if the text message that was received was from a local user, the designation of attachments may be performed by manually selecting a resource from the collected resources data structure, via the graphical user interface, invoking a slideshow operation that automatically determines a next resource to attach to text messages, using an automated mechanism that performs a contextual search of the already collected resources based on the individual context of the text message, or the like. Thus, in the above outlined operation, when it is stated that a text message is received along with any attachments, the receipt of the text message and its attachments may be performed in response to a user inputting text and causing either the illustrative embodiments to select a resource to attach via one or more of the mechanisms previously described, or the user specifically selecting a resource to attach to the text message.

In addition to the ability to manually or automatically identify and attach resources to text messages of an instant messaging session, as previously mentioned above, the illustrative embodiments further include mechanisms for modifying text messages based on the detected context of the messages. In one illustrative embodiment, the modification of such text messages involves the manual and/or automatic insertion of resources or links to resources into the text messages themselves before transmission of the messages to other participants in the instant messaging session. For example, the text messages may be modified to include a link to a resource in association with a detected keyword in the text message. In other illustrative embodiments, detected potentially ambiguous terms, such as acronyms, may be identified and modified to be less ambiguous by replacement with corresponding non-ambiguous text based on the context of the instant messaging session and/or the text message.

Figure 6:
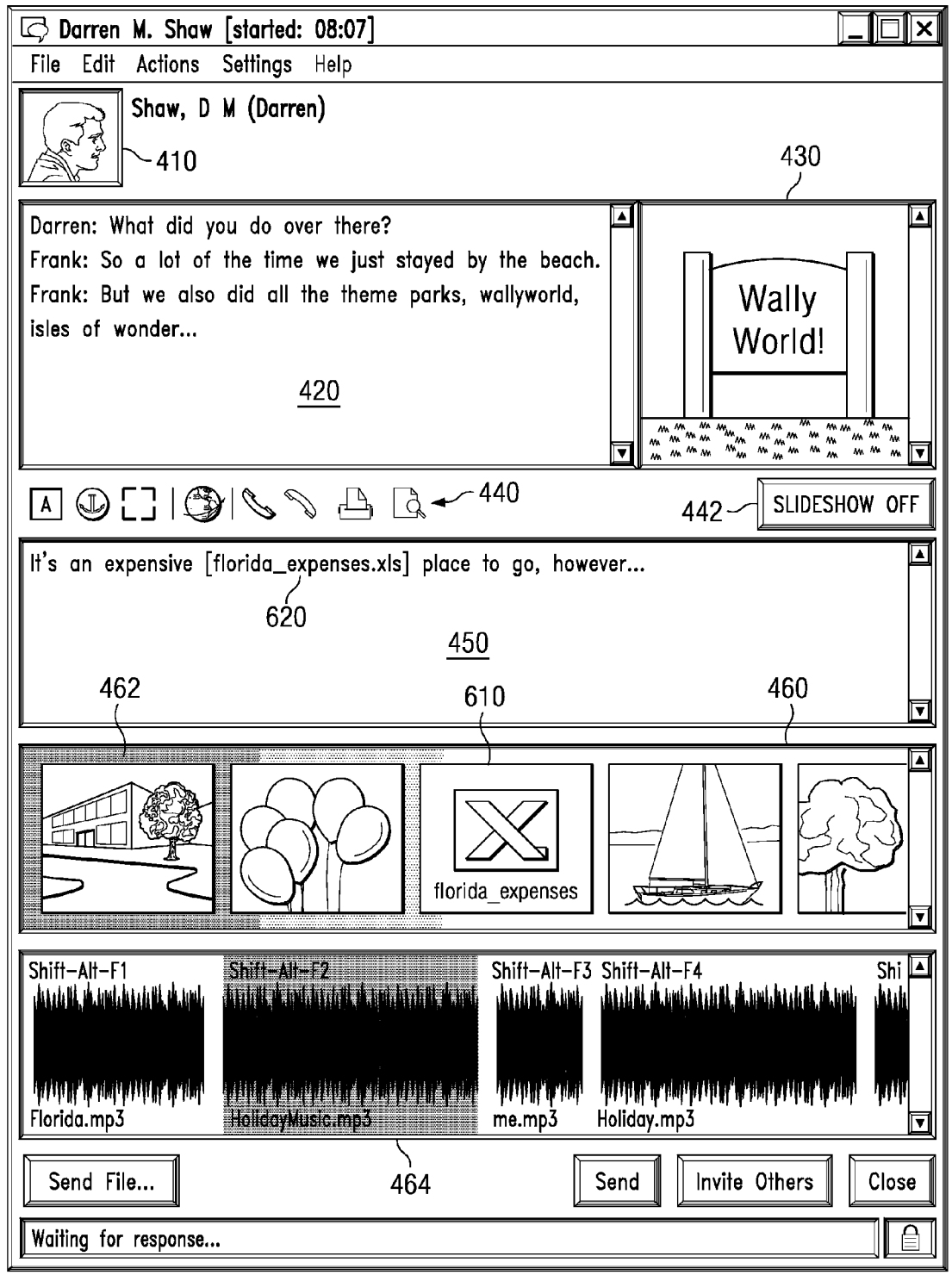
FIG. 6 is an exemplary diagram of an instant messaging graphical user interface in which inline text information is inserted based on a context analysis in accordance with one illustrative embodiment.

FIG. 6 is an exemplary diagram of an instant messaging graphical user interface in which inline text information is inserted based on a context analysis in accordance with one illustrative embodiment. The graphical user interface of FIG. 6 is essentially the same as the graphical user interface of FIG. 4 described previously. With significance to the presently described illustrative embodiment, a Microsoft Excel™ spreadsheet resource entitled "florida_expenses.xls" 610 is part of the resource pool section of the graphical use interface and thus, is part of the collected resources data structure. The spreadsheet resource 610 may have been added to the resource pool section and collected resources data structure either manually or by way of one of the automated context analysis based illustrative embodiments described previously.

Either manually, or by way of automatic context analysis of the last entered text message, a reference or link 620 to the spreadsheet resource 610 may be inserted into the text of the last entered text message prior to it being transmitted to the other designated participants of the instant messaging session. For example, a user may manually, through a drag-and-drop operation, select a resource representation from the resource pool section of the graphical user interface and drop it onto the text message in the current message section of the graphical user interface at a point in the text message where the user wishes the reference to the resource to be inserted.

Alternatively, the current text message may be analyzed using the context analysis engine of the illustrative embodiments to thereby identify keywords or other context information. The text message modification engine, e.g., text message modification engine 392 in FIG. 3, may automatically identify, by way of the context analysis engine, the spreadsheet resource as pertaining to the context of the current text message. Such identification may be made solely on the context of the current text message or a combination of the context of the current text message and the context of the instant messaging session as a whole.

The text message modification engine may automatically insert a reference to the spreadsheet resource into the current text message in association with a most appropriate keyword identified in the current text message, e.g., the keyword "expenses." The reference may be, for example, a hyperlink to the resource's storage location so that selection of the hyperlink may be made by a user to thereby access the resource.

In this way, resources may be exchanged with other participants in the instant messaging session in such a manner that the actual access of the resources may be left up to the recipients in the instant messaging session. That is, individual participants may choose to access or not to access the resource themselves rather than having the resource automatically output to the participants in response to the resource being attached to a text message in the instant messaging session.

FIG. 7 is a flowchart outlining an exemplary operation for performing inline text information insertion of instant messages in accordance with one illustrative embodiment. As shown in FIG. 7, the operation starts by receiving a text message as part of an instant messaging session (step 710). The context of the text message is analyzed to determine context information for searching for resources having a similar context (step 720). Resources having a similar context are identified (step 730). These resources may be identified from all available resources, such as through a search of local and/or remote sources of resources as described previously above. Alternatively, these resources may be identified from those resources that are already part of the resource pool, i.e. from resources that are already identified as being pertinent to the context of the instant messaging session.

The text message is modified to include the resource or a reference to the resource that was identified (step 740). The text message may then be transmitted to the identified participants in the instant messaging session (step 750) and is then added to the instant messaging session history (step 760). The operation then terminates.

Figure 8:
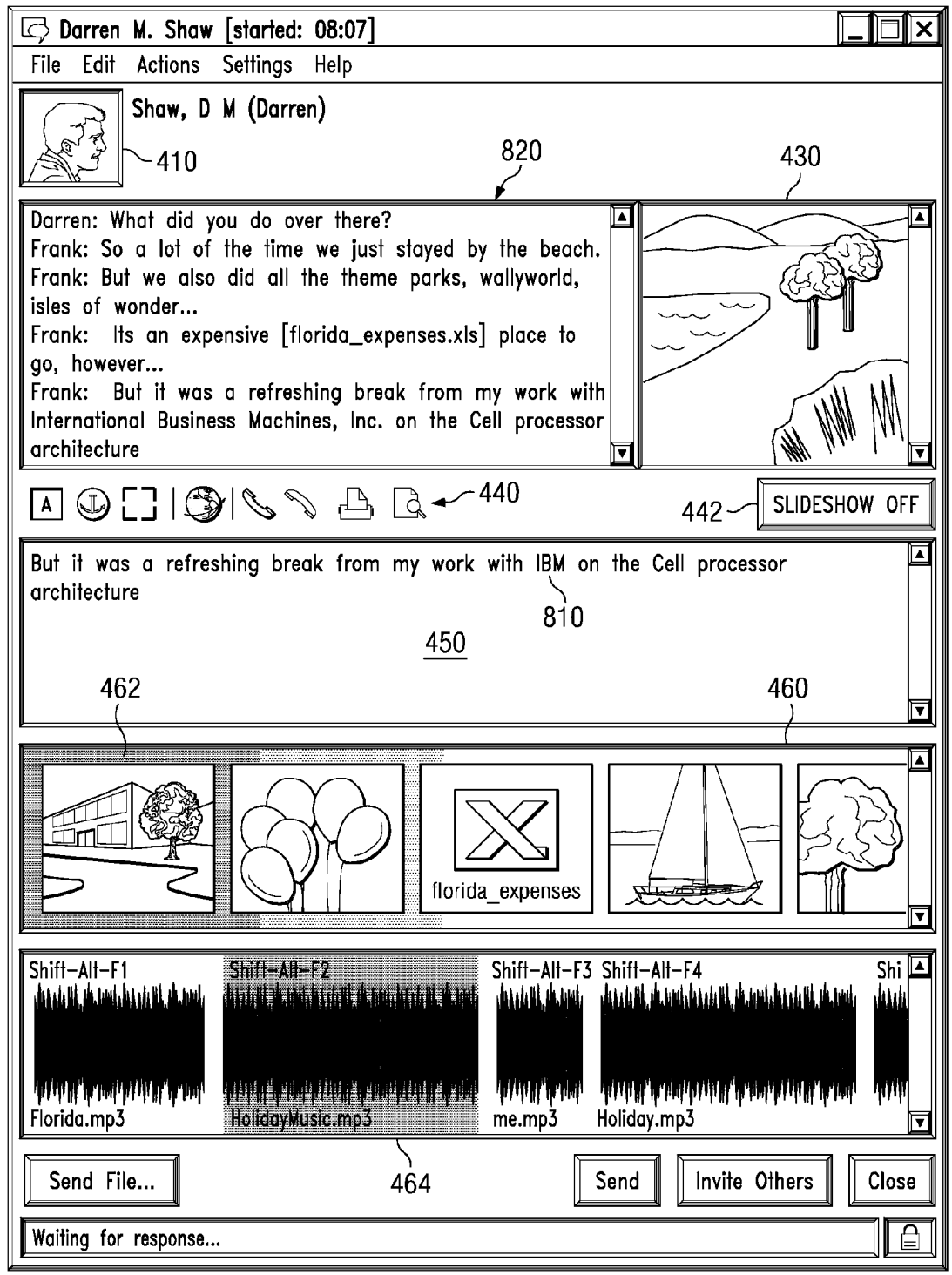
FIG. 8 is an exemplary diagram of an instant messaging graphical user interface in which disambiguation of terms is performed based on a context analysis in accordance with one illustrative embodiment.

As a further example of text message modifications that may be performed using the mechanisms of the illustrative embodiments, ambiguous terms may be made more clear by way of context analysis of the instant messaging session. FIG. 8 is an exemplary diagram of an instant messaging graphical user interface in which disambiguation of terms is performed based on a context analysis in accordance with one illustrative embodiment.

As shown in FIG. 8, the graphical user interface is essentially the same as the graphical user interface of FIGS. 4 and 6 described previously. With significance to the presently described illustrative embodiment a user may enter a text message into the current message section of the graphical user interface that may include ambiguous terms. Before sending the text message to other participants in the instant messaging session, the text message may be analyzed by the context analysis engine to determine if ambiguous terms, e.g., acronyms or other terms that may have significantly different meanings depending upon their context, are present. The identification of such ambiguous terms may be based on pre-established rules for identifying such terms and/or a listing of such terms maintained in a database or other data structure associated with the context analysis engine, for example.

If an ambiguous term is determined to be present, corresponding possible replacement text may be identified. The identification of replacement text may be identified, for example, based on the determination of the context of the instant messaging session and/or the text message itself. Again, various keywords may be associated with potential replacement text to thereby define the context with which the potential replacement text is associated. A comparison of the keywords identified in the instant messaging context and/or the current text message may be made with the keywords associated with the potential replacement text. Based on the results of such a comparison, replacement text for the current context may be identified and used to replace the ambiguous terms identified in the text message.

In the depicted example, the term "IBM" 810 in the current text message is identified as being potentially ambiguous. For example, depending on the context, the term "IBM" 810 may refer to the International Brotherhood of Magicians or to the company International Business Machines, Inc. Keywords may be extracted from the current text message, e.g., "Cell," "processor," and "architecture." These keywords may be compared to keywords associated with the two alternative replacement text "International Brotherhood of Magicians" and "International Business Machines, Inc." Since processors and architectures, and especially the Cell processor, are part of the area of expertise of International Business Machines, Inc. and are not related to the purpose or work of the International Brotherhood of Magicians, the replacement text "International Business Machines, Inc." will be selected to replace the term "IBM" 810 in the current text message prior to sending the text message to other participants of the instant messaging session.

FIG. 9 is a flowchart outlining an exemplary operation for performing disambiguation of terms in an instant message in accordance with one illustrative embodiment. As shown in FIG. 9, the operation starts by receiving a text message as part of an instant messaging session (step 910). The context of the text message is analyzed to identify any ambiguous terms in the text message (step 920). Potential replacement text for any ambiguous terms is identified (step 930). The context of the text message is analyzed to identify a context for comparison with context information for the potential replacement text (step 940).

The context information for the current text message is compared to the context information associated with the potential replacement text to thereby identify replacement text for the identified ambiguous term (step 950). The text message is then modified to replace the ambiguous term with the replacement text having a similar context (step 960). The text message is then transmitted to the other identified participants in the instant messaging session (step 970) and is added to the instant messaging session history (step 980). The operation then terminates.

Thus, the illustrative embodiments provide a context enhanced messaging and collaboration system in which the context of an instant messaging session is analyzed and used as a basis for generating a pool of resources having similar context. A user or automated mechanism may select resources from this pool of resources having a similar context in order to attach the selected resources to text messages as part of the instant messaging session. Resources attached to text messages are shared between the designated participants of the instant messaging session. A graphical user interface is further provided for facilitating such contextual searching on an instant messaging session and outputting the results of such contextual searching.

The illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As described previously above, a data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for context based instant messaging, comprising:

generating a graphical user interface for performing instant messaging between a computing device and one or more other computing devices;

receiving input from a user via the graphical user interface; and attaching a resource to an instant message to be exchanged between the computing device and the one or more other computing devices based on the input from the user, wherein the graphical user interface comprises a resource pool section having representations of resources related to a context of a current instant messaging session, wherein the resource pool section is populated by:

analyzing a context of one or more text messages of the current instant messaging session;

performing a search for one or more resources having a similar context to the context of the one or more text messages of the current instant messaging session; and automatically populating the resource pool section of the graphical user interface with representations of the one or more resources having a similar context to the context of the one or more text messages of the current instant messaging session, wherein the resource pool section of the graphical user interface has a plurality of sub-sections, wherein each sub-section is associated with a different type of resource, and wherein a first sub-section comprises image files, a second sub-section comprises audio files, and a third sub-section comprises audio-video files, wherein the resource that is attached to the instant message is selected from the resource pool section of the graphical user interface, wherein the graphical user interface further includes a display tray section that is distinct from the text of the one or more text messages, and wherein a representation of a resource currently being shared between the computing device and at least one other computing device is provided in the display tray section of the graphical user interface so that the user knows which resources of the resource pool section are currently being shared.

2. The method of claim 1, wherein the input from the user is a user selection of the resource from the resource pool section of the graphical user interface.

3. The method of claim 1, wherein the input from the user is a drag-and-drop operation for adding a representation of a resource to the resource pool section of the graphical user interface.

4. The method of claim 1, further comprising:

associating a command with one or more of the representations of resources in the resource pool section of the graphical user interface, and wherein in response to the user input being the command, an associated resource is attached to a current text message of the current instant messaging session.

5. The method of claim 1, wherein the graphical user interface further comprises a slideshow control element, and wherein in response to user selection of the slideshow control element, a next resource in a sequence of representations of resources in the resource pool section of the graphical user interface is selected for attachment to each subsequent text message transmitted by the computing device during the current instant messaging session.

6. The method of claim 1, wherein the resource that is attached to the text message is selected based on a random selection of a representation of the resource from representations of resources in the resource pool section of the graphical user interface.

7. The method of claim 1, further comprising:

analyzing a context of the one or more text messages by extracting keywords from the one or more text messages in an instant messaging session history data structure.

8. The method of claim 7, further comprising:

performing a search for one or more resources having a similar context to the context of the one or more text messages of the current instant messaging session by performing a search of metadata associated with resources using the extracted keywords.

9. The method of claim 1, further comprising:

attaching the resource to the text message by inserting the resource or a reference to the resource in the text of the text message prior to transmitting the text message to the one or more other computing devices.

10. The method of claim 1, further comprising:

identifying an ambiguous term in the text message;

identifying replacement text for the ambiguous term; and replacing the ambiguous term with the replacement text prior to transmission of the text message to the one or more other computing devices.

11. The method of claim 10, wherein identifying replacement text for the ambiguous term further comprises:

analyzing a context of one or more text messages of the current instant messaging session; and selecting replacement text having an associated context that is similar to the context of the one or more text messages of the current instant messaging session.

* * * * *